United States Patent [19]

Trimmer

[11] 4,282,913
[45] Aug. 11, 1981

[54] SELF-LOCKING NUT AND MANUFACTURE AND COMPONENT THEREFOR

[75] Inventor: Paul A. Trimmer, Berkeley Heights, N.J.

[73] Assignee: Amerace Corporation, New York, N.Y.

[21] Appl. No.: 884,638

[22] Filed: Mar. 8, 1978

Related U.S. Application Data

[63] Continuation-in-part of Ser. No. 781,485, Mar. 25, 1977, abandoned.

[51] Int. Cl.³ .............................................. F16B 39/34
[52] U.S. Cl. .................................... 411/303; 10/86 A; 264/267
[58] Field of Search .................. 151/7, 14.5; 10/86 A, 10/10 P; 264/267, 269, 297; 427/181, 182, 195, 216, 221, 239, 375

[56] References Cited

U.S. PATENT DOCUMENTS

| | | | |
|---|---|---|---|
| 2,429,103 | 10/1947 | Mitchell | 151/14 R X |
| 3,203,041 | 8/1965 | Beuter et al. | 151/7 X |
| 3,203,459 | 8/1965 | Coldren | 151/7 |
| 3,294,139 | 12/1966 | Preziosi | 151/7 |
| 3,316,338 | 4/1967 | Riere | 151/7 X |
| 3,480,311 | 11/1969 | Lanham | 151/7 X |
| 3,498,352 | 3/1970 | Duffy | 151/7 |
| 3,522,830 | 8/1970 | Blizard | 151/7 |
| 3,830,902 | 8/1974 | Barnes | 151/7 UX |
| 3,908,727 | 9/1975 | Osborne | 151/7 |
| 3,975,787 | 8/1976 | Newnom | 10/86 A |

*Primary Examiner*—Ramon S. Britts
*Attorney, Agent, or Firm*—Richard A. Craig

[57] ABSTRACT

Disclosed herein is a prevailing torque type self-locking nut comprising a one-piece nut body having an internal screw thread surmounted by a well portion having an internal surface spaced from the thread axis a distance greater than one-half the major thread diameter, and a thin-walled self-locking element of thread impressionable thermoplastic material at least partly in the well portion and having an external surface secured by adhesion to the internal surface of the well portion and an internal surface spaced from the thread axis a distance less than one-half the major thread diameter. Also disclosed herein are a method of making such a nut, the method involving melting powder of the thermoplastic material in situ in the nut body, a pin useful in carrying out the method and a nut body component of the self-locking nut.

39 Claims, 14 Drawing Figures

SELF-LOCKING NUT AND MANUFACTURE AND COMPONENT THEREFOR

RELATED APPLICATION

This is a continuation-in-part of copending application Ser. No. 781,485 filed Mar. 25, 1977, now abandoned.

BACKGROUND OF THE INVENTION

This invention relates to self-locking nuts of the prevailing torque type, in which the locking characteristic is provided by thermoplastic material, a method of making such nuts, a pin useful in carrying out the method and a nut body component of such self-locking nut.

Sauer U.S. Pat. No. 2,450,694, granted Oct. 5, 1948, discloses a prevailing torque type self-locking nut (hereinafter sometimes "the Sauer nut") comprising a one-piece metallic nut body having a threaded bore portion, a first end of which is adapted to be entered by a mating externally threaded member. At a second end of the threaded bore portion is an annular recess or well formed in part by a circumferentially continuous annular flange portion extending axially away from the first end. The flange portion includes a cylindrical surface coaxial with and confronting the axis of the threaded bore portion. The Sauer nut also includes a pre-formed nylon collar mechanically held in the recess. The flange portion is crimped to engage the upper surface of the collar, thus to retain the same in the recess and prevent the same from turning relative to the body. The collar has an internal cylindrical surface confronting and coaxial with the thread axis and having a diameter which is somewhat less than the major thread diameter, so that continued rotation of the externally threaded member, after it traverses the threaded bore portion, will cause it to engage the cylindrical surface of the collar to impress a thread therein and achieve the desired self-locking effect, all in known fashion.

The pre-formed collar of the Sauer nut has a radial thickness which is quite large, thus imposing certain limitations on the overall dimensions of the nut, which limitations are in certain cases undesirable, as will be more fully explained hereinafter.

The Sauer nut has long been, and continues to be, preeminent among prevailing torque type self-locking nuts.

However, for many years it has been evident that it is highly desirable to develop a new self-locking nut which is capable of being manufactured at a significantly reduced cost relative to that of the Sauer nut but which is at least as good as the Sauer nut as to all significant performance criteria.

The present invention has culminated the search for such a new nut.

The nut of the present invention can be made at a substantial reduction in cost relative to the Sauer nut, and is at least as good as the Sauer nut as to all significant performance criteria.

In addition, as noted, the manufacture of the Sauer nut entails crimping of the skirt portion after the collar has been placed in the recess. This has two disadvantages. One, there is a limit to the hardness and hence ultimate tensile strength of the Sauer nut, as any heat treatment to develop that strength must be accomplished before the collar is placed in the recess and hence before the crimping operation. Also, the nut body blank of the Sauer nut cannot be cold formed of high work hardenable material. Two, in the Sauer nut, the crimped flange portion overlies and extends axially beyond the collar, thus contributing to the overall height of the nut without contributing to its locking ability or strength.

The present invention avoids the crimping operation and in fact does not involve any metal working operation after the formation of the nut body. Hence, with the present invention, the nut body may be heat treated to any desirable hardness, and hence strength, thus making it possible to achieve a nut of improved strength-to-weight ratio with respect to the Sauer nut.

Thus, with the present invention, for a given thread size a smaller and lighter nut can be utilized, or a stronger nut can be utilized, all to the benefit of the end user.

By eliminating the crimping operation, the present invention also avoids the necessity for the crimped flange or more load bearing threads can be built into the nut body for the same overall nut height.

Rieke U.S. Pat. No. 3,316,338, granted Apr. 25, 1967, discloses a prevailing torque type self-locking nut (hereinafter sometimes "the Rieke nut") in which an internally threaded metallic nut body is provided with an annular recess located axially adjacent one end of the nut thread. An annular groove is pierced in the recess to provide a double undercut-like configuration. The radial nut surface adjacent the recess is knurled to provide better adherence of a locking element. A bolt having a thread and a smooth shank which corresponds to the core diameter of the nut thread is turned into threaded engagement with the nut thread, with the smooth shank in registry with the recess. This assembly is then dipped in plastic powder, so that the recess is filled with powder which is also mounded up along the bolt shank. Thereafter the bolt-nut assembly, with powder, is placed on a heating plate to carry out a fusing process by heating the same to the melting point of the powder which is thereby fused into a unitary body said to be firmly bonded to the nut body after cooling and solidification. After cooling, the bolt is unscrewed from the nut in the direction such that the shank traverses the nut thread. The cooled plastic material, which extends over the face of the nut body, is said to form a unit with the nut.

The nut body of the Rieke nut is complex and therefore expensive to manufacture, especially due to the necessity for piercing the double undercut groove in the recess. Also, it is noted that the radial dimension of the recess is quite large, resulting in a locking element which has a ratio of axial length to radial thickness, apparently not greater than about 1, which is on the same order of magnitude as the ratio of the axial length to radial thickness of the pre-formed collar of the Sauer nut.

With the disclosed method of making the Rieke nut, it is impossible to prevent the plastic locking element from extending over the adjacent face of the nut body. Furthermore, such method is not adaptable to mass production techniques.

Newnom U.S. Pat. No. 3,975,787, granted Aug. 24, 1976, discloses a prevailing torque type self-locking nut (hereinafter sometimes "the Newnom nut") having a standard metallic nut body having a circumferentially uninterrupted internal screw thread. The self-locking feature is derived from a ring-like plastic patch having a circumferential extent of greater than 180° adhered to the thread of the nut body. The Newnom nut is satisfactory for applications which do not require the performance capabilities of the Sauer nut. The Newnom nut is made by a method which involves seating the nut body, either end first, on a pin a tapered portion of which cooperates with the circumferentially uninterrupted thread to define a cavity into which powder of the plastic material is inserted. The nut body is then heated to melt the powder.

It is therefore an important object of the present invention to provide a prevailing torque type self-locking nut which is of significantly lower cost than the Sauer nut but which is at least as good as the Sauer nut as to all significant performance criteria.

It is another object to provide a prevailing torque type self-locking nut having a nut body provided with a circumferentially uninterrupted internally threaded portion and a well portion surmounting the threaded portion and a locking element of thermoplastic material in the well portion and bonded to the wall thereof.

It is a further object to provide a prevailing torque type self-locking nut which is not subject to the dimensional limitations required of the Sauer nut or the Rieke nut.

It is an additional object to provide a method of making a prevailing torque type self-locking nut, which method is simple and inexpensive and at the same time reliable and readily adaptable to mass production techniques.

Additional objects are to provide a pin which is useful in carrying out the method and a nut body which is a component of the self-locking nut and which can be produced, as by cold forming, at reduced cost relative to the nut body of the Sauer nut.

SUMMARY OF THE INVENTION

In its article aspect, the present invention is a prevailing torque type self-locking nut which comprises a one-piece metallic nut body and a radially thin self-locking element of thread impressionable thermoplastic material.

The nut body has first and second opposite ends and contains an internal screw thread of predetermined pitch, predetermined nominal thread height and predetermined fundamental triangle height H, and is located between the first and second ends of the body. The thread itself has a first axial end adjacent the first end of the body and adapted to be entered by a mating externally threaded member.

The nut body further has a well portion which extends axially from the second end of the body toward the thread. The well portion has an internal surface, which in the illustrated embodiments is cylindrical. The internal surface faces the thread axis and is spaced therefrom a distance which is greater than one-half the major thread diameter. In the illustrated embodiments, the last-mentioned distance is not greater than about 105% of one-half the major thread diameter.

The self-locking element is in the well portion and has an external surface secured by adhesion to the internal surface of the well portion and an internal surface which confronts the thread axis and is spaced therefrom a distance which is less than one-half the major thread diameter and which in the illustrated embodiments is just slightly less than one-half the minor thread diameter.

Preferably, the axial end of the self-locking element remote from the thread is substantially axially coincident with the second end of the nut body and thus the locking element does not overlap the second end of the nut body, or vice versa.

Also, in the illustrated embodiments the internal surface of the well portion is cylindrical and the external and internal surfaces of the self-locking element are cylindrical, so that the latter is in the form of a thin-walled bushing, tube or sleeve.

The axial length of the self-locking bushing is greater than twice the pitch of the thread and the ratio of the axial length of the self-locking bushing to its radial thickness is at least 2.5. In the illustrated embodiments, this ratio is 3.4 or more.

The radial thickness of the self-locking bushing is quite small, being not greater than the fundamental triangle height H.

In Paragraph 6.13, HANDBOOK H28 (1969) SCREW-THREAD STANDARDS FOR FEDERAL SERVICES, Issued March 1970 by the National Bureau of Standards (SD Catalog No. C13.11:28) defines "Fundamental Triangle Height", designated "H", as follows: "The fundamental triangle height of a thread, that is, the height of a sharp-V thread, is the distance, measured radially, between the sharp major and minor cylinders or cones".

The inventive method is carried out with the aid of a pin. The pin has a nut body support surface of greater transverse dimension than the thread, a cylindrical sealing portion of diameter just small enough to be received within the thread, a cylindrical cavity-defining portion coaxial with and of smaller diameter than the sealing portion and an annular sealing shoulder facing in generally the same direction as the nut body support surface and joining the cylindrical portions.

In the performance of the method, the nut body is placed, its first end first, on the pin until such first end rests on the nut body support surface and the sealing portion is within the thread and the cavity-defining portion is within the well portion, to establish therewith an upwardly-facing cavity open at the second end of the nut body. Powder of the thermoplastic material is deposited in the cavity and thereafter heated until all of it has become molten and is a unitary mass in wetting contact with the internal surface of the well portion but spaced radially outwardly of the location occupied by the cavity-forming portion of the pin. Thereupon the nut body is cooled to that the thermoplastic material solidifies, to provide the desired self-locking element having an external surface bonded to the internal surface of the well portion of the nut body and an internal surface confronting the thread axis and spaced therefrom a distance less than one-half the major thread diameter. At an appropriate time after the powder starts to melt, the nut body is removed from the pin in the direction opposite that in which the nut body was placed on the pin.

More specifically, the powder depositing step is accomplished by dropping powder into the cavity completely to fill the cavity. During the powder depositing step, an excess of powder is deposited on the second end of the nut body and such excess is removed prior to the heating step.

The heating step is carried out by passing the assembly of the nut body and the pin between a pair of induction heating coils, thus to cause that powder which is adjacent to the internal surface of the well portion to be the first powder to melt and the melting to proceed thence radially inwardly toward the thread axis.

DESCRIPTION OF THE DRAWING

The invention will be described with reference to the accompanying drawing in which.

DESCRIPTION OF THE INVENTION

Figure 1:
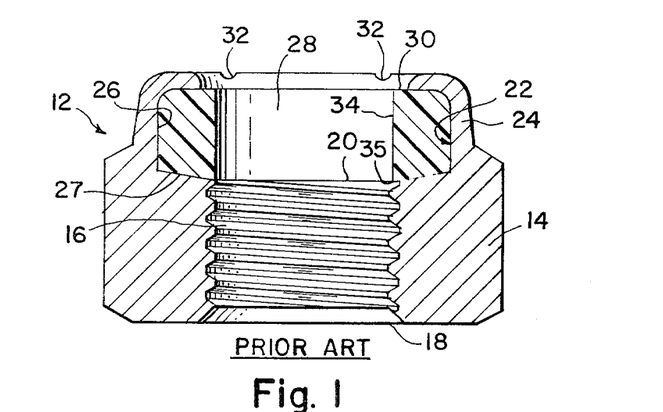
FIG. 1 is an axial sectional view of a prior art self-locking nut as taught by Sauer U.S. Pat. No. 2,450,694.

FIG. 1 shows, in axial section, a prior art nut 12, as taught by Sauer U.S. Pat. No. 2,450,694 and over which the present invention is an improvement. Nut 12 is of the prevailing torque type and comprises a one-piece metallic nut body 14 having a threaded bore portion 16. A first end 18 of nut 12 and of bore portion 16 is adapted to be entered by a mating externally threaded member (not shown). At a second end 20 of threaded bore portion 16 is an annular recess or well 22 formed in part by a circumferentially continuous annular flange portion 24 which extends axially away from first end 18 and which includes a cylindrical surface 26 coaxial with and confronting the axis of threaded bore portion 16. Nut body 14 further has an annular countersunk shoulder 27 facing away from end 18 and joining surface 26 and second end 20 of threaded portion 16.

Prior art nut 12 also includes a pre-formed (as by injection molding) nylon locking collar 28 mechanically held in recess 22. Flange portion 24 is crimped so as to be in engagement with upper surface 30 of collar 28, thus to retain the same in recess 22 and prevent the same from turning relative to body 14. Resistance of collar 28 to turning may be aided by staking the portion of flange portion 24 overlying collar 28 at predetermined locations, as shown at 32. Collar 28 has an internal cylindrical surface 34 which is coaxial with and confronts the axis of threaded bore portion 16 and which has a diameter which is somewhat less than the major thread diameter, so that continued rotation of the externally threaded member, after it traverses threaded bore portion 16, will cause it to engage cylindrical surface 34 of collar 28, to impress a thread therein and achieve the desired self-locking effect, all in known fashion. Since collar 28 is preformed, it tends to have a sharp corner 35 at the axial end of surface 34 adjacent threaded bore portion 16.

FIGS. 2, 3, 7 and 11 show a first preferred nut 36 embodying the present invention. Nut 36 comprises a one-piece metallic nut body 38 having a first end 40 providing nut 36 with a work clamping surface and a second end 42 opposite and parallel to first end 40. Body 38 is also shown in FIGS. 6, 8, 9 and 10.

Figure 2:
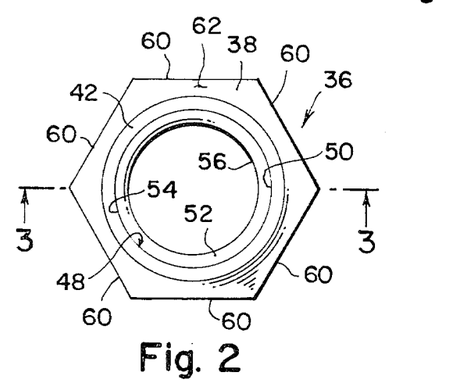
FIG. 2 is a plan view of a first nut embodying the invention, comprising a nut body and a locking bushing.
Figure 3:
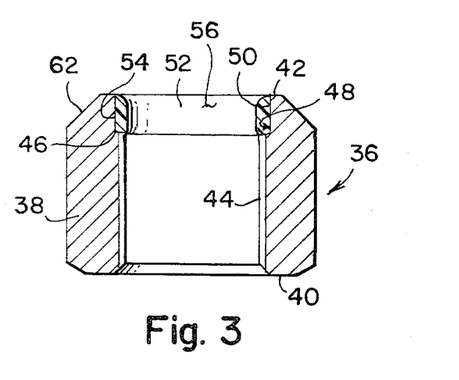
FIG. 3 is a view on line 3—3 of FIG. 2.

Body 38 also has a circumferentially uninterrupted internal screw thread 44 of predetermined major and minor diameters, located between ends 40 and 42. The axis of thread 44 is perpendicular to ends 40 and 42 and one axial end of thread 44 is adjacent end 40 of body 38, so as to be adapted to be entered by a mating externally threaded member.

Body 38 further has an annular countersunk shoulder 46 surrounding the axis of thread 44 and facing away from end 40 at the other end of thread 44 and a well portion 48 extending axially from second end 42 of body 38 toward thread 44 and in open communication with end 42 and thread 44. Well portion 48 has an internal circumferentially and axially continuous cylindrical surface 50 coaxial with thread 44 and spaced from the thread axis a distance greater than one-half the major thread diameter. Surface 50 is of a predetermined axial extent and joins second end 42 of body 38 and shoulder 46.

Nut 36 further includes a thin-walled self-locking bushing, tube or sleeve 52 of thread impressionable thermoplastic material, such as nylon, located in well portion 48 and having an external circumferentially continuous surface 54 secured by adhesion to surface 50 throughout substantially the entire axial and circumferential extent thereof. Bushing 52 also has an internal circumferentially continuous surface 56 confronting and substantially coaxial with the thread axis and spaced therefrom a distance less than one-half the major thread diameter. The axial end of bushing 56 adjacent thread 44 may be slightly flared outwardly in a bellmouth like configuration, as shown at 58, as seen particularly in FIG. 7, to facilitate entry of a mating externally threaded member into bushing 52.

Nut body 38 is also provided with hexagonal external wrenching surfaces 60 equidistant from the thread axis and extending axially throughout a major portion of the axial length of body 38. Wrenching surfaces 60 define a hexagonal wrenching configuration of predetermined standard across-the-flats-dimension.

Body 38 also has an external conical surface 62 coaxial with thread 44 and joining end 42 and wrenching surfaces 60 and providing a visual indication distinguishing end 40 from end 42 and also means whereby the nut can be properly oriented by automatic feeding equipment.

Nuts 36 of the ⅝-18 thread size have been made by the hereinafter disclosed methods and successfully tested.

The following parameters apply to such nuts 36 of the ⅝-13 thread size:

TABLE 1

Nut 36 of ⅜ - 18 Thread Size

Overall nut height (distance from surface 40 to surface 42) - 0.760 inch;
Nut height (from surface 40 to surface 42) - 0.606 inch;
Height of surface 50 and axial length of bushing 52 - 0.154 inch;
Diameter of nut body surface 50 - 0.641 to 0.648 inch;
Diameter of bushing surface 56 - 0.557 to 0.569 inch;
Radial thickness of bushing 52 - 0.036 to 0.046 inch;
Minor diameter of thread 44 - 0.571 to 0.579 inch;
Major diameter of thread 44 - 0.625 inch minimum;
Countersunk shoulder 46 - 170° included angle;
Across-the-flats dimension of wrenching surfaces 60 - 0.928 to 0.940 inch; and
Weight per 100 pieces - 9.5 pounds.

By way of comparison, the following parameters apply to a corresponding hexagonal commercial prior art nut 12 of the ⅜-18 inch thread size:

TABLE 2

Prior Art Nut 12 of ⅜ - 18 Thread Size

Overall nut height - 0.750 inch;
Nut height (from end 18 to surface 26) - 0.596 inch;
Diameter of surface 26 - 0.828 inch;
Diameter of surface 34 - 0.552 inch minimum (and in most instances about same as minor diameter of thread);
Minor diameter of thread - 0.571 to 0.579 inch;
Major diameter of thread - 0.625 inch minimum;
Countersunk shoulder 27 - 170° included angle;
Across-the-flats dimension of hexagonal wrenching surfaces - 0.928 to 0.940 inch; and
Weight per 100 pieces - 8.9 pounds.

In the manufacture of prior art nut 12, during the crimping of flange portion 24 into engagement with the upper surface 30 of collar 28, the latter is somewhat deformed. Prior to assembly with body 14, pre-formed collar 28 has inner and outer coaxial cylindrical surfaces and upper and lower plane parallel surfaces perpendicular to the upper and lower surfaces. Initially, the dimensions of collar 28 for the commercial prior art nut 12 of the ⅜-18 thread size are as follows:

TABLE 3

Collar 28 of Prior Art Nut 12 of ⅜ - 18 Thread Size

Diameter of inner surface (which becomes surface 34) - 0.583 to 0.589 inch;
Diameter of outer surface (which confronts surface 26) - 0.813 to 0.817 inch;
Radial thickness - 0.112 to 0.117 inch;
Distance from upper surface to lower surface - 0.135 to 0.145 inch.

Figure 4:
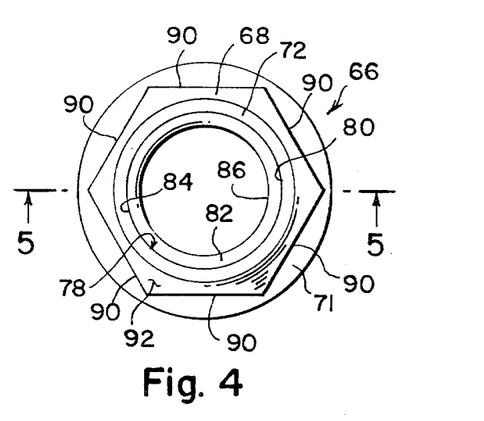
FIG. 4 is a plan view of a second nut embodying the invention, comprising a nut body and a locking bushing.
Figure 5:
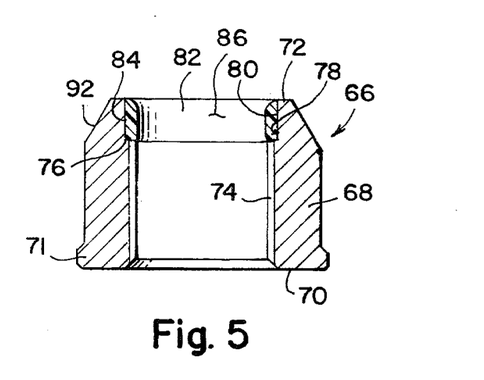
FIG. 5 is a view on line 5—5 of FIG. 4.

FIGS. 4 and 5 show a second preferred nut 66 embodying the present invention. Nut 66 takes advantage of the fact that the present invention involves no deformation of metal after the locking element is in place, as will be explained in greater detail below.

Nut 66 comprises a one-piece metallic nut body 68 having a first end 70 having an external cylindrical flange 71, providing nut 66 with a work clamping surface and a second end 72 opposite and parallel to first end 70. Flange 71 is quite thin in the axial direction.

Body 68 also has a circumferentially uninterrupted internal screw thread 74 of predetermined major and minor diameters, located between ends 70 and 72. The axis of thread 74 is perpendicular to ends 70 and 72 and one axial end of thread 74 is adjacent end 70 of body 68, so as to be adapted to be entered by a mating externally threaded member.

Body 68 further has an annular countersunk shoulder 76 surrounding the axis of thread 74 and facing away from end 70 at the other end of thread 74 and a well portion 78 extending axially from second end 72 of body 68 toward thread 74 and in open communication with end 42 and thread 74. Well portion 78 has an internal circumferentially and axially continuous cylindrical surface 80 coaxial with thread 74 and spaced from the thread axis a distance greater than one-half the major thread diameter. Surface 80 is of a predetermined axial extent and joins second end 72 of body 68 and shoulder 76.

Nut 66 further includes a thin-walled self-locking bushing, tube or sleeve 82 of thread impressionable thermoplastic material, such as nylon, located in well portion 78 and having an external circumferentially continuous surface 84 secured by adhesion to surface 80 throughout substantially the entire axial and circumferential extent thereof. Bushing 82 also has an internal circumferentially continuous surface 86 confronting and substantially coaxial with the thread axis and spaced therefrom a distance less than one-half the major thread diameter. The axial end of bushing surface 86 adjacent thread 74 may be slightly flared outwardly in a bell-mouth like configuration (in the manner shown at 58 in FIG. 7 for bushing 52), to facilitate entry of a mating externally threaded member.

Nut body 68 is also provided with hexagonal external wrenching surfaces 90 equidistant from the thread axis and extending axially throughout a major portion of the axial length of body 68. Wrenching surfaces 50 to 90 define a hexagonal wrenching configuration of predetermined standard across-the-flats dimension, but smaller than that of nut body 38.

Body 68 also has an external conical surface 92 coaxial with thread 74 and joining end 72 and wrenching surfaces 90 and providing a visual indication distinguishing end 70 from end 72 and also means whereby the nut can be properly oriented by automatic feeding equipment.

Nuts 66 of the ⅜-18 thread size have been made by the hereinafter disclosed method and successfully tested.

The following parameters apply to such nuts 66 of the ⅜-18 thread size:

TABLE 4

Nut 66 of ⅜ - 18 Thread Size

Overall nut height (distance from surface 70 to surface 72) - 0.685 inch;
Nut height (from surface 70 to surface 80) - 0.531 inch;
Height of surface 80 and axial length of bushing 82 - 0.154 inch;
Diameter of nut body surface 80 - 0.641 to 0.648 inch;
Diameter of bushing surface 86 - 0.557 to 0.569 inch;
Radial thickness of bushing 82 - 0.036 to 0.046 inch;
Minor diameter of thread 74 - 0.571 to 0.579 inch;
Major diameter of thread 74 - 0.625 inch minimum;
Countersunk shoulder 76 - 170° included angle;
Across-the-flats dimension of wrenching surfaces 90 - 0.865 to 0.877 inch;
Outside diameter of flange 71 - 1.047 inches; and
Weight per 100 pieces - 7.1 pounds.

It will be seen that the ⅜-18 nut 66 achieves a weight saving of about 20% with respect to the ⅜-18 prior art nut 12. This weight saving is made possible by the fact that the present invention involves no metal deformation after the locking element is in place in the nut body, thus permitting heat treatment of the nut body to increase its strength and reduce its size, primarily by utilizing a smaller, but still a standard size hexagonal wrenching configuration.

Even without the strength consideration, the present invention makes possible significant weight saving (reduction of size of hexagonal wrenching configuration). In the ⅜-18 prior art nut 12, the 0.828 inch diameter of surface 26 requires that the outer diameter of flange portion 24 be 0.892 inch, which latter dimension must be less than the across-the-flats dimension of the hexagonal wrenching configuration. Thus, it would be impossible to utilize in the ⅜-18 prior art nut 12 the 0.865 to 0.877 inch across-the-flats dimension of the ⅜-18 nut of 66 of the present invention, which is possible in the latter nut due to the radial thinness of bushing 52.

Thus, the present invention has overcome a geometric limitation on the size of the hexagonal wrenching configuration. So far as geometry is concerned, with the present invention, it is merely necessary that the across-the-flats dimension of the hexagonal wrenching configuration be greater than the diameter of surface 50 or 80.

Prior art nuts 12 of the ⅜-18 thread size and nuts 36 of the same thread size, and made by the hereinafter described method, have been subjected to torque reuse tests in accordance with Military Specification MIL-N-25027. Both passed with the following substantially equivalent results, all of which are in inch-pounds:

TABLE 6

Torque Reuse Tests

Prior Art Nut 12 of ⅜ - 28 Thread Size

| Sample | 1st On | 1st Off | 7th On | 7th Off | 15th On | 15th Off |
|---|---|---|---|---|---|---|
| 1 | 100 | 110 | 100 | 120 | 100 | 120 |
| 2 | 95 | 100 | 120 | 130 | 95 | 95 |
| 3 | 120 | 100 | 60 | 60 | 60 | 60 |
| 4 | 150 | 140 | 140 | 135 | 100 | 100 |
| 5 | 120 | 140 | 150 | 145 | 115 | 110 |

Nut 36 of ⅜ - 18 Thread Size

| Sample | 1st On | 1st Off | 7th On | 7th Off | 15th On | 15th Off |
|---|---|---|---|---|---|---|
| 1 | 140 | 160 | 120 | 140 | 60 | 75 |
| 2 | 100 | 140 | 100 | 140 | 90 | 110 |
| 3 | 150 | 150 | 110 | 120 | 50 | 60 |
| 4 | 135 | 115 | 95 | 100 | 45 | 44 |
| 5 | 120 | 120 | 110 | 130 | 110 | 90 |
| 6 | 120 | 140 | 100 | 115 | 70 | 70 |
| 7 | 120 | 120 | 140 | 140 | 75 | 75 |

The MIL-N-25027 requirement for each "On" torque is 300 inch-pounds maximum and for each "Off" torque is 32 inch-pounds minimum.

The method of the present invention will now be described as related to the production of nut 36. In broad terms, the method utilizes powder of thermoplastic material, such as nylon, which powder is placed within surface 50 of nut body 38 which is then heated to melt the powder. Upon cooling, the molten thermoplastic material solidifies to form the desired bushing 52 strongly adhered to surface 50.

More particularly, the steps of the method are illustrated in FIGS. 6 through 11. The method is carried out with the aid of a pin or mandrel 100. Pin 100 is of a material to which the melted thermoplastic material will not adhere. Examples of suitable mandrel material are fluoroplastic resins, such as Teflon, as is well known.

Figure 6:
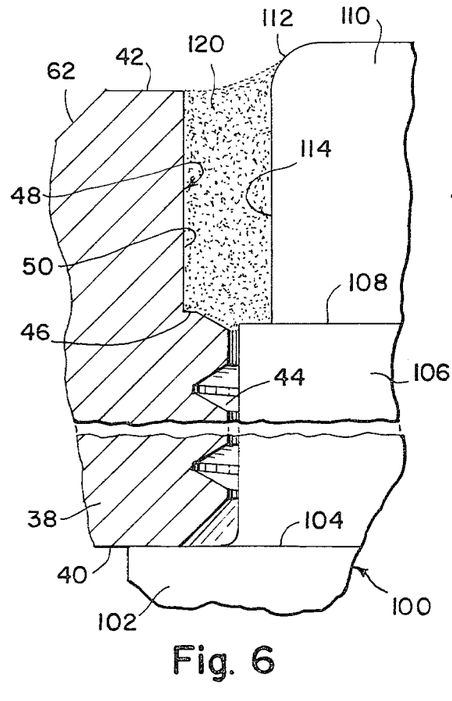
FIG. 6 is an enlarged fragmentary view showing in axial section, a nut body as in FIGS. 2 and 3, and, in axial elevation, a pin, the nut body mounted on the pin, with powder of thermoplastic material filling a cavity between the nut body and the pin.

Pin 100 has a bottom cylindrical portion 102 of predetermined diameter, an intermediate or sealing cylindrical portion 106 of smaller diameter than bottom portion 102 and a top or cavity-defining cylindrical portion 110 of smaller diameter than intermediate portion 108. Top cylindrical portion 110 has a rounded tip 112 at the axial end thereof remote from portion 102.

Portions 102, 106 and 110 are coaxial and portions 102 and 106 are joined by a plane annular shoulder or nut body support surface 104 perpendicular to the axis of pin 100, while portions 106 and 110 are joined by a plane annular shoulder or sealing surface 108, also perpendicular to the axis of pin 100. The intersection of portion 106 and sealing surface 108 is abrupt, to provide a sharp corner therebetween.

Pertinent dimensions of the pin 100 which was used in manufacturing nuts 36 of the ⅜-18 thread size are as follows:

TABLE 7

Pin 100 for Nut 36 of ⅜ - 18 Thread Size

Diameter of bottom portion 102 and outer diameter of nut support surface 104 - 0.812 inch;
Diameter of intermediate portion 106 and outer diameter of sealing surface 108 - 0.562 inch;
Diameter of top portion 110 - 0.477 to 0.483 inch;
Axial length of intermediate portion 106 - 0.596 inch;
Axial length of top portion 110 - 0.194 inch;
Combined axial length of portions 106 and 110 - 0.790 inch; and
Radius of rounded tip 112 - 0.060 inch.

Nut body 38 is placed on pin 100, with the axis of pin 100 vertical, until end 40 rests on nut body support surface 104, and the axis of thread 44 is substantially coincident with the axis of pin 100. With body 38 and pin 100 thus assembled, the following relationships appear: intermediate portion 106 is within thread 44 with a radial clearance of about 0.004 to about 0.008 inch therebetween; sealing surface 108 lies in a plane which is about 0.01 inch below the plane of the end of surface 50 adjacent thread 44; and the axial end of pin 100 remote from portion 102 lies in a plane which is about 0.030 inch above surface 42.

Nut body 38 and pin 100 cooperate to provide an annular cavity 114 which is open at end 42 of nut body 38. More particularly, cavity 114 is defined by surface 50, the upper end of thread 44 and shoulder 46 of nut body 38 and by top cylindrical portion 110 and sealing surface 108 of pin 100. Cavity 114 has a radial dimension of about 0.080 to 0.084 inch.

With body 38 assembled with pin 100 as aforesaid, these parts are passed under a powder supply tube 116 (FIG. 8) which provides a constantly flowing stream 118 of powder of the thermoplastic material, thus to deposit powder in cavity 114 until it is completely filled. During such depositing an excess amount of powder may be deposited on surface 42 of body 38 and on the end of pin 100 remote from portion 102. Sealing surface 108 prevents any substantial amount of powder from falling out the bottom of cavity 114.

Figures 8, 9:
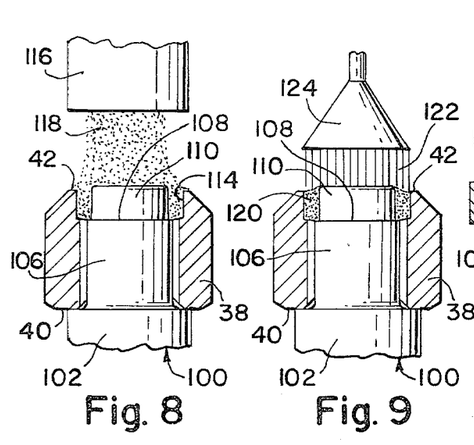
FIGS. 8 through 11 are views showing in axial section, the nut body of FIGS. 2, 3, 6 and 7 and in fragmentary axial elevation, the pin of FIGS. 6 and 7, these views depicting in sequence a series of steps in the manufacture of the nut of FIGS. 2 and 3.

Any such excess powder is removed by passing the body 38-pin 100 assembly beneath a hood 124 in the form of an inverted funnel and which subjects the cavity end of the assembly to a puff of air 122, all as shown in FIG. 9.

Removal of excess powder may also be aided by brushing upper end of the body 38-pin 100 assembly with a felt wiper (not shown) after powder deposition (FIG. 8) and prior to subjecting the assembly to the puff of air 122.

After removal of excess powder, the situation is as best shown in FIG. 6, with powder completely filling cavity 114 as shown at 120 and possibly slightly running up onto rounded tip 112 of pin 100.

Figure 10:
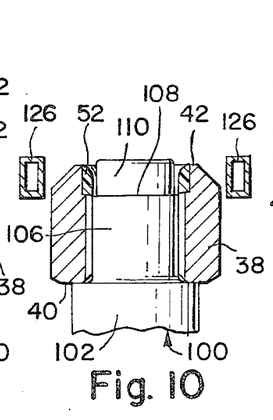

Next, the body 38-pin 100 assembly is passed between a pair of parallel induction heating elements 126 which are located close to body 38 in the axial vicinity of top portion 110 of pin 100, as shown in FIG. 10. Heating elements 126 heat body 38 to a temperature sufficiently high to melt powder 120. The first powder to melt is that in contact with surface 50. The melting proceeds thence inwardly until all of powder 120 has been melted. When powder of thermoplastic material is melted and then solidified, the volume of solidified thermoplastic material is substantially less than that previously occupied by the powder. For rough purposes, it may be deemed that the solidified material occupies about one-half the volume previously occupied by the powder. Because the melting of powder 120 proceeds from the outside in, the surface tension of the molten thermoplastic material adjacent surface 50 draws additional thermoplastic material which is located immediately inwardly of the already molten thermoplastic material into the molten mass, and so on until all of powder 120 has become molten, and the molten material is a unitary mass in wetting contact with surface 50 but spaced radially outwardly of the location occupied by portion 110 of pin 100.

Figure 7:
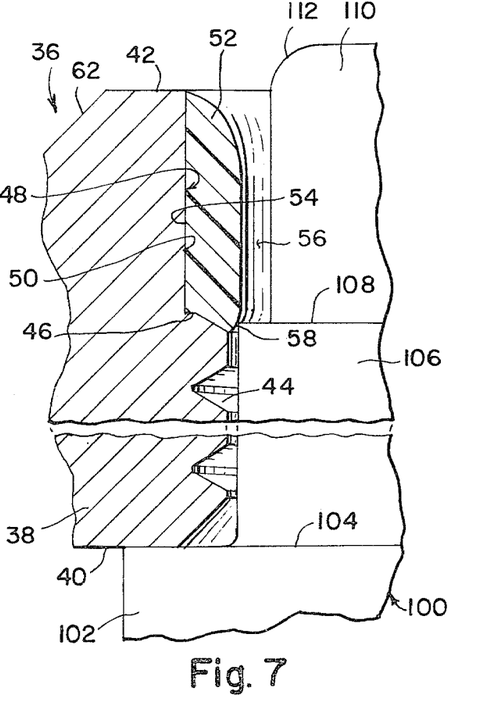
FIG. 7 is a view similar to FIG. 6 but showing the completed nut of FIGS. 2 and 3 and further showing the dimensional relationships among the nut body, the bushing and the pin.

Upon subsequent cooling, the thermoplastic material within surface 50 solidifies, thus to provide the desired self-locking bushing 52 strongly adhered to surface 50. FIG. 7 shows the dimensional relationships between bushing 52 and pin 100. It is also noted that, due to the surface tension of the molten thermoplastic powder, the axial ends of bushing surface 56 may become slightly flared outwardly, providing a meniscus-like contour.

Figure 11:
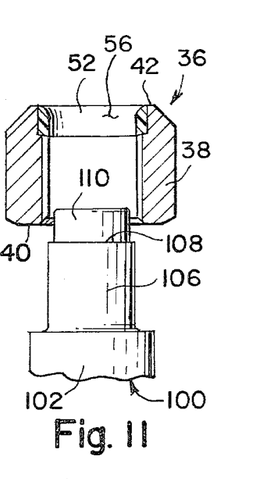

At an appropriate time after powder 120 starts to melt, nut 36 is removed from pin 100, as indicated in FIG. 11.

The axial end of bushing 52 remote from thread 44 is axially coincident with end 42 of nut body 38, thus overcoming the dimensional restrictions which are inherent in prior art nut 12 due to the crimped flange portion of the latter.

Adherence of the bushing to the nut body may be enhanced by grit blasting surface 50 to provide up to 3½ times the original surface area, by applying a chromate or an iron phosphate conversion coating (40 to 90 mg/square foot) to provide protection against infusion of water along the bond line between nut body 38 and bushing 52, applying a primer (such as an epoxy) to surface 50, and/or by utilizing a type of nylon powder in which a primer is incorporated. An example of the latter is available from Thermoclad Company, 4688 Iroquois Avenue, Erie, Pennsylvania 15511, under the designation "DURALON JM". DURALON JM is a nylon powder which incorporates a primer. The particle size is approximately as follows:

5% coarser than 80 mesh;
45% 80 to 200 mesh; and
50% finer than 200 mesh.

An important consideration is the tendency of the molten thermoplastic material to sag, i.e., to become concentrated at the bottom of cavity 114 before it has had an opportunity to solidify. If sagging is severe enough, the result is a unsatisfactory product.

It has been found that the sagging problem can be avoided if the ratio of the axial length of bushing 52 or 82 to its radial thickness is quite large. More particularly, if that ratio is at least about 2.5, sagging is generally not a problem. For the ⅝-18 nuts 36 and 66, dimensioned as above, the ratio can vary between about 3.4 and 4.3.

From the foregoing dimensions of collar 28 of the ⅝-16 prior art nut 12, it can be seen that the maximum value of the ratio of the axial length of collar 28 to its radial thickness is about 1.3, a figure which is typical for prior art nuts 12 of all thread sizes.

The diameter of bushing surface 56 or 86 is largely predetermined by the desired locking action of the nut, as is the axial length of bushing 52 or 82, that axial length being on the order of magnitude of several thread pitches. To maximize the ratio of the axial length of bushing 52 or 82 to its radial thickness, the diameter of surface 50 or 80 is chosen to be as small as possible, just large enough so that the integrity of the bond of bushing surface 54 or 84 to nut body surface 50 or 80 is not destroyed when the external thread of a complementary member traverses and impresses a thread in bushing 52 or 82.

For the ⅝-18 nuts 36 and 66, dimensioned as above, the diameter of surfaces 50 and 80 is 103% of the nominal major thread diameter. In other nuts 36 and 66, the diameter of surfaces 50 and 80 may be up to 105% of the nominal major thread diameter.

Other techniques for alleviating the sagging problem include the incorporation of the thixotropic agent (such as silica or mica particles) in the thermoplastic powder, inverting the nut while it is cooling and/or accelerating cooling by quenching in an oil bath.

It is to be understood that the use herein of the term "thermoplastic material" is broad enough to include such material containing additives, such as primers and thixotropic agents.

Other modifications which might be used to enhance retention of the bushing include making surface 50 or 80 ellipsoidal (to provide partial thread engagement along the minor axis of the ellipse or not); interrupting surface 50 or 80 with thread segments extending to nut body end 42 or 72; roughening surface 50 or 80 by providing the same with shallow corrugations, flutes or splines; or providing surface 50 or 80 with a reverse taper, as by staking nut body end 42 or 72 while nut body 38 or 68 is being formed.

To revert to the hereinabove disclosed method, several seconds are required for powder 120 to become completely molten after body 38-pin 100 assembly passes heating elements 126. It has been found that it is possible to remove body 38 from pin 100 at any time after melting is substantially underway but before it is complete, with no adverse effect on the finished product. It is even more unnecessary for body 38 to remain on pin 100 until the thermoplastic material completely solidifies. Hence, the parts may never be physically related as shown in FIG. 7.

Some users of prevailing torque type self-locking nuts have specifications therefor, which specifications include maximum dimensional limitations for axial nut length, often making no dimensional provision for the inclusion of a self-locking element surmounting the nut thread.

Figure 12:
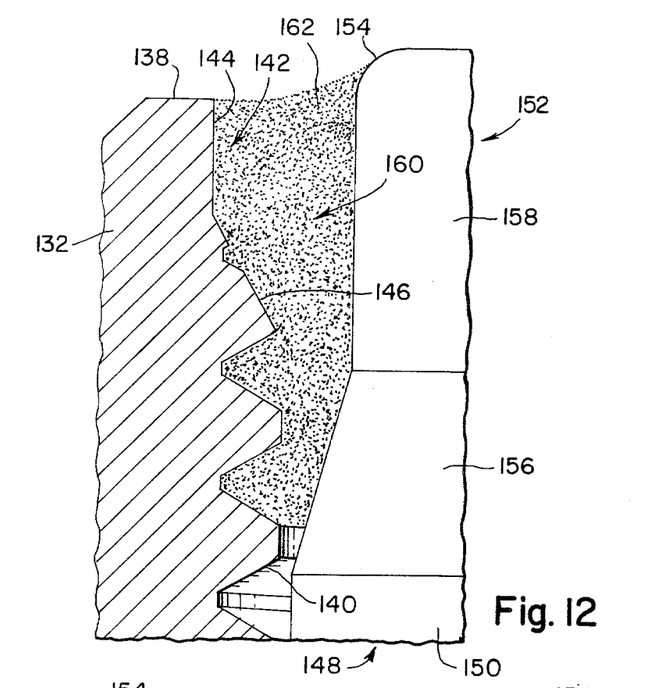
FIG. 12 is a view similar to FIG. 6 but showing a modified nut body and modified pin.
Figure 13:
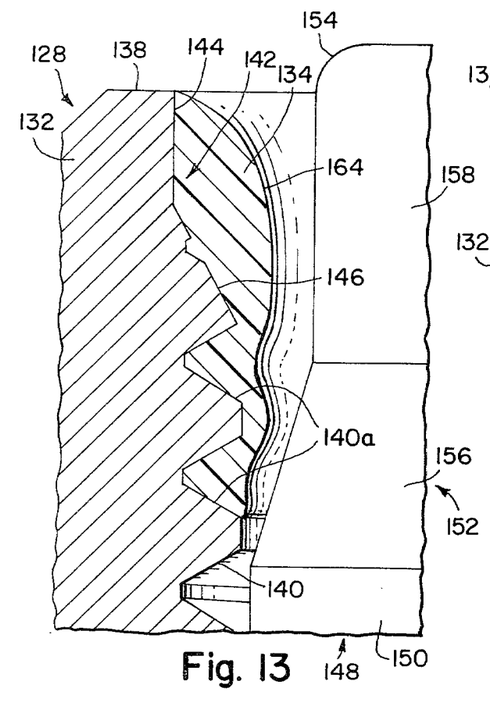
FIG. 13 is a view similar to FIG. 7 but showing a first modified completed nut which may be made from the nut body of FIG. 12 with the aid of the pin of FIG. 12 and further showing for the first modified completed nut the dimensional relationships among the bushing, the nut body and the pin.
Figure 14:
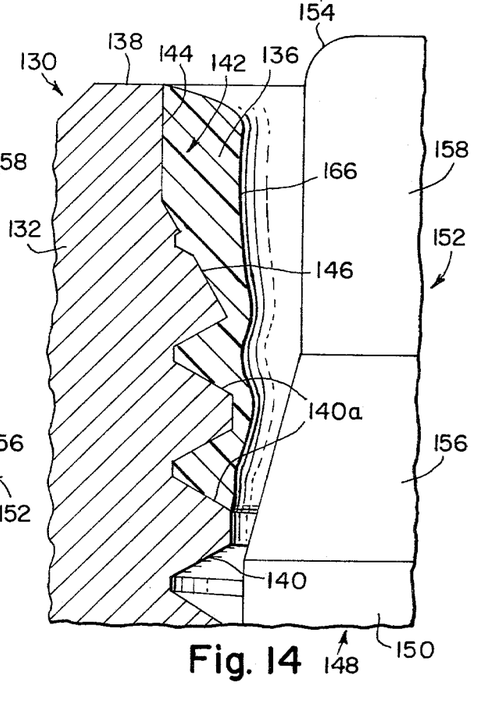
FIG. 14 is a view similar to FIG. 13 but showing a second modified completed nut which may be made from the nut body of FIG. 12 with the aid of the pin of FIG. 12 and further showing for the second modified completed nut the dimensional relationships among the bushing, the nut body and the pin.

Substantial reductions in the axial length of nuts embodying the invention can be achieved by utilizing the techniques illustrated in FIGs. 12, 13 and 14.

FIGs. 13 and 14 show first and second modified nuts 128 and 130, respectively, embodying the invention. Each of nuts 128 and 130 includes a modified one-piece metallic nut body 132 (FIGS. 12, 13 and 14). Nut 128 further includes a thin-walled self-locking bushing, tube or sleeve 134 of thread impressionable thermoplastic material, such as nylon, and nut 130 further includes a thin-walled self-locking bushing, tube or sleeve 136. Bushings 134 and 136 differ only as to their internal configurations, as described hereinafter.

Modified nut body 132 has a first end (not shown) providing a work clamping surface, a second end 138 and a circumferentially uninterrupted internal screw thread 140 of predetermined major and minor diameters and predetermined pitch located between the work clamping surface and end 138. The axis of thread 140 iis perpendicular to the work clamping surface and end 138 and one axial end of thread 140 is adjacent the work clamping surface, so as to be adapted to be entered by a mating externally threaded member. Nut body 132 further has a well portion 142 extending axially from second end 138 toward thread 140 and in open communication with end 138 and thread 140. Well portion 142 has an internal circumferentially and axially continous cylindrical surface 144 coaxial with thread 140 and spaced from the thread axis a distance greater than one-half the major thread diameter. Surface 144 joins second end 138 and extends therefrom a predetermined axial distance toward thread 140. The last-mentioned axial distance may be on the order of magnitude of one thread pitch.

The axial end of cylindrical surface 144 remote from end 138 intersects a countersunk surface 146 coaxial with surface 144 and having a predetermined conical angle, which for nut body 132 is about 60°. Thread 140 runs out on countersunk surface 146.

The diameter of surface 144 and the magnitude of the conical angle of surface 146 are such that surface 146 interrupts thread 140 over an axial distance which may be on the order of magnitude of one thread pitch, or slightly greater.

The diameter of surface 144 may be between about 101% and about 105% of the major thread diameter.

FIGS. 12, 13 and 14 show nut body 132 mounted on a pin 148, which is of a material to which the melted thermoplastic material used for locking elements 134 and 136 will not adhere. Pin 148 has a bottom cylindrical portion (not shown) of predetermined diameter and providing a nut body support surface, an intermediate or sealing cylindrical portion 150 of smaller diameter than the bottom portion and a cavity-defining portion 152 which has a rounded tip 154 at the axial end thereof remote from portion 150.

Cavity-defining portion 152 is defined in part by a frusto-conical element 156 coaxial with and axially joining and extending from cylindrical portion 150. Element 156 is of maximum diameter at its circle of juncture with portion 150. Cavity-forming portion 152 is further defined by a cylindrical element 158 coaxial with element 156 and axially extending from the end of element 156 to rounded tip 154.

The diameter of cylindrical portion 150 is slightly less than the minor thread diameter, and is such that portion 150 can be freely received, but just barely so, within thread 140.

The conical angle of frusto-conical element 156 may be about 30° and its axial length, between its circle of juncture with cylindrical portion 150 and its circle of juncture with cylindrical element 158, may be between one and one-half and two thread pitches.

Nut body 132 is placed on pin 148, with the axis of pin 148 vertical, until the work clamping surface rests on the nut body support surface of pin 148, and the axis of thread 140 is substantially coincident with the axis of pin 148. With nut body 132 and pin 148 thus assembled, it should be noted that the plane of the circle of juncture of frusto-conical element 156 and cylindrical element 158 may coincide or nearly coincide with the plane of the circle of juncture of countersunk surface 146 and the cylinder of the minor thread diameter. The axial length of cylindrical element 158 is such that the axial end of element 158 remote from element 156 lies in a plane slightly above second end 138 of nut body 132.

Nut body 132 and pin 148 cooperate to provide an annular cavity 160 (FIG. 12) which is open at end 138 of nut body 132. More particularly, cavity 160 is defined by surface 144, surface 146, the portion of thread 140 confronting frusto-conical element 156, frusto-conical element 156 and cylindrical element 158.

With body 132 assembled with pin 148, cavity 160 is filled with powder of the thermoplastic material as shown at 162 in FIG. 12, in previously described fashion. Next, the body 132-pin 158 assembly is passed between a pair of induction heating elements which heat body 132 to a temperature sufficently high to melt powder 162, thus to become a unitary mass in wetting contact with surface 144, surface 146 and the adjacent portion of thread 140.

Upon subsequent cooling, the thermoplastic material within body 132 solidifies, thus to provide bushing 134 (FIG. 13) or 136 (FIG. 14), having an external surface secured by adhesion to surface 144, surface 146 and the full thread 140 axially adjacent surface 146, as indicated at 140a. The axial extent of bushing 134 or 136 on the full thread 140 is, as shown, somewhat greater than one thread pitch. The portion of the bushing adhered to thread 140 may be circumferentially continuous, as is the case with nuts 128 or 130, or it may be circumferentially limited. In the latter event, the portion of the bushing on thread 140 may be in the form of at least one axially extending finger.

Nut 128 or 130 may be plated, as with cadmium, after formation of bushing 134 or 136. Such plating should be carried out in an acidic plating bath, since it has been found that if an alkaline bath, such as cyanide, is used the adhesion of the self-locking element to the nut body is adversely affected. Surprisingly, with an acidic plating bath, such adhesion is not affected.

It is to be noted that bushing 134 (FIG. 13) has an inner surface 164 confronting the nut axis and spaced therefrom a distance less than one-half the major diameter of thread 140. More particularly, inner surface 164 is spaced from the nut axis a distance which is less than one-half the minor diameter of thread 140. It is also to be noted that the portion of inner surface 164 axially adjacent end 138 is somewhat convex, due to slight sagging during cooling of the thermoplastic material. The portion of inner surface 164 axially remote from end 138 in general follows the contour of thread 140 and is slightly outwardly flared at the axial end of bushing 134 which is entered by a mating externally threaded member.

It is to be noted that bushing 136 (FIG. 14) has an inner surface 166 confronting the nut axis and spaced therefrom a distance less than one-half the major diameter of thread 140. More particularly, inner surface 166 is spaced from the nut axis a distance which is less than one-half the minor diameter of thread 140. It is also to be noted that the portion of inner surface 166 axially adjacent end 138 is substantially cylindrical. The portion of inner surface 166 axially remote from end 138 in general follows the contour of thread 140 and is slightly outwardly flared at the axial end of bushing 136 which is entered by a mating externally threaded member.

Both nut 128 and nut 130 were made using a thermoplastic powder which was a mixture of DURALON JM nylon 11 powder and epoxy, the latter being introduced to enhance adhesion of the bushing to the nut body. Various ratios of epoxy to total weight of the mixture have been tried. It has been found that if the ratio is 15% or greater, the bushing will exhibit undesirable fissuring, which leaves something to be desired from the standpoint of apperance.

For nuts 128 and 130, the ratio of the axial length of that portion of the self-locking element which is within well portion 142 to the radial thickness of that portion is substantially less than 2.5. For that condition, it has been found that if DURALON JM nylon 11 powder alone is used for the self-locking element, sagging is a problem. However, it has been discovered that if the ratio of epoxy of total weight of the mixture is greater than about 3½%, the results are surprising as to the sagging problem. Epoxy alone sags significantly, but when said ratio is greater than 3½%, sagging is much less than when either is used alone.

Accordingly, the preferred range for said ratio is between 3½% and 15% and a particularly preferred ratio is about 7½%.

In any event, the mixture which was used to make nuts 128 and 130 was about 10% epoxy and 90% DURALON JM nylon 11 powder.

In the fabrication of nut 128, nut body 132 was maintained in an upright position during cooling, whereas in the fabrication of nut 130, nut body 132 was inverted during cooling. This difference in processing accounts for the difference between the contours of bushing surfaces 164 and 166, that of the latter being slightly preferable to that of the former. By following the techniques of FIGS. 12, 13 and 14, it has been possible to reduce axial nut length by about 1½ to 2 pitches.

The parts may never be physically related as shown in FIGS. 13 and 14, for the same reason given in the foregoing discussion of FIG. 7.

Alternatively, a nut of the present invention may be made by pre-forming the locking element, inserting the same in the well portion of the nut body and then causing the pre-formed locking element to adhere to the internal surface of the well portion.

The foregoing description of the invention in its various aspects is by way of example only, the scope of the invention being defined by the following claims.

The embodiments of the invention in which an exclusive property or privilege is claimed are as follows:

1. A prevailing torque type self-locking nut comprising a metallic nut body having first and second opposite ends, an internal screw thread of predetermined nominal major and minor diameters, said thread located between said ends and having a first radial end adjacent said first end of said body and adapted to be entered by a complementary externally threaded member, said body further having a well portion extending axially from said second end of said body toward said thread, said well portion having an internal surface facing the thread axis and spaced therefrom a distance greater than one-half the major thread diameter, and a self-locking element of thread impressionable thermoplastic material, at least a substantial portion of which is within said well portion and having an external surface secured by adhesion to said internal surface of said well portion, an internal surface at least in part initially unthreaded and confronting the thread axis and spaced therefrom a distance less than one-half the major thread diameter, a first axial end facing the first end of said body and a second axial end facing the second end of said body, the ratio of the axial length of said element to its radial thickness being greater than 2.5 and said element is formed by melting powder of said material in situ.

2. The invention of claim 1 wherein said ratio is at least 3.4.

3. The invention of claim 1 wherein the axial length of said element is greater than twice the pitch of said thread.

4. The invention of claim 1 wherein the element is a circumferentially continuous bushing and the internal surface of said well portion is circumferentially continuous.

5. The invention of claim 4 wherein the internal surface of said well portion is cylindrical and coaxial with the nut thread and the internal surface of said bushing is substantially cylindrical in the well portion and substantially coaxial with the nut thread.

6. The invention of claim 4 wherein the axial end of the internal surface of said bushing at the first end of said bushing is outwardly flared.

7. The invention of claim 4 wherein both axial ends of the internal surface of said bushing are outwardly flared.

8. A prevailing torque type self-locking nut comprising a metallic nut body having first and second opposite ends, an internal screw thread of predetermined pitch, predetermined nominal major and minor diameters, predetermined nominal thread height and predetermined fundamental triangle height H, said thread located between said ends and having a first axial end adjacent said first end of said body and adapted to be entered by a complementary externally threaded member, said body further having a well portion extending axially from said second end of said body toward said thread, said well portion having a cylindrical internal surface facing and coaxial with the thread axis and spaced therefrom a distance greater than one-half the major thread diameter, and a cylindrical self-locking bushing of thread impressionable thermoplastic material substantially entirely within said well portion and having an external surface secured by adhesion to said cylindrical internal surface of said well portion and an initially unthreaded internal surface confronting and coaxial with the thread axis and spaced therefrom a distance less than one-half the major thread diameter, the radial thickness of said bushing between its said external and internal surfaces being not greater than H and the axial length of said bushing being greater than twice said pitch and said bushing is formed by melting powder of said material in situ.

9. The invention of claim 8 wherein the axial end of said bushing remote from said thread is substantially axially coincident with the second end of said body.

10. The invention of claim 8 wherein the axial end of the internal surface of said bushing adjacent the thread is outwardly flared.

11. The invention of claim 8 wherein the internal surface of said bushing is outwardly flared at both of its axial ends.

12. The invention of claim 8 wherein the ratio of the axial length of said bushing to its radial thickness is greater than 2.5.

13. The invention of claim 12 wherein said ratio is at least 3.4.

14. A prevailing torque type self-locking nut comprising a one-piece metallic nut body having first and second opposite ends, an internal screw thread of predetermined pitch, predetermined nominal major and minor diameters, predetermined nominal thread height and predetermined fundamental triangle height H, said thread located between said ends and having a first axial end adjacent said first end of said body and adapted to be entered by a complementary externally threaded member, said body further having a well portion extending axially from said second end of said body toward said thread, said well portion having an internal surface facing the thread axis and spaced therefrom a distance greater than one-half the major thread diameter, and a self-locking element of thread impressionable thermoplastic material, at least a substantial portion of which is within said well portion and having an external surface secured by adhesion to said internal surface of said well portion, an internal surface at least in part initially unthreaded and confronting the thread axis and spaced therefrom a distance less than one-half the major thread diameter, a first axial end facing the first end of said body and a second axial end facing the second end of said body, the radial thickness of said element between its said external and internal surfaces being not greater than H and said element is formed by melting powder of said material in situ.

15. The invention of claim 14 wherein the radial thickness of said element is less than H.

16. A prevailing torque type self-locking nut comprising a metallic nut body having first and second opposite ends, an internal screw thread located between said ends and having a first axial end adjacent said first end of said body and adapted to be entered by a complementary externally threaded member, said body further having a well portion extending axially from said second end of said body toward said thread, said well portion having an internal surface facing the thread axis and spaced therefrom a distance greater than one-half the major thread diameter, and a self-locking element of thread impressionable thermoplastic material at least partly within said well portion and having an external surface secured by adhesion to said internal surface of said well portion, an internal surface at least in part initially unthreaded and confronting the thread axis and spaced therefrom a distance less than one-half the major thread diameter, a first axial end facing the first end of said body and a second axial end facing the second end of said body, the second end of said element being substantially axially coincident with the second end of said body and said element is formed by melting powder of said material in situ.

17. A prevailing torque type self-locking nut comprising a metallic nut body having first and second opposite ends, an internal screw thread of predetermined nominal major and minor diameters, said thread located between said ends and having a first axial end adjacent said first end of said body and adapted to be entered by a complementary externally threaded member, said body further having a well portion extending axially from said second end of said body toward said thread, said well portion having an internal surface facing the thread axis and spaced therefrom a distance greater than one-half the major thread diameter, and a self-locking element of thread impressionable thermoplastic material at least partly within said well portion and having an external surface secured by adhesion to said internal surface of said well portion and an internal surface at least in part initially unthreaded and confronting the thread axis and spaced therefrom a distance less than one-half the major thread diameter and having a portion of increasing distance from the thread axis in the axial direction toward said thread and said element is formed by melting powder of said material in situ.

18. The invention of claim 17 wherein the melting is accomplished by applying heat radially inwardly to the powder through the wall of said body.

19. The invention of claim 1 wherein the first axial end of said self-locking element is substantially axially coincident with the axial end of said well portion remote from said second body end.

20. The invention of claim 1 wherein said self-locking element has a first axial end which is axially between the axial end of said well portion remote from said second body end and the first end of said nut thread.

21. The invention of claim 1 wherein said self-locking element is partly in said well portion and partly on said nut thread.

22. The invention of claim 21 wherein the external surface of said self-locking element is secured by adhesion to said nut thread.

23. The invention of claim 22 wherein said nut body has a countersunk surface axially between said well portion and the first end of said nut body and said thread runs out on said countersunk surface.

24. The invention of claim 23 wherein said self-locking element axially traverses said countersunk surface.

25. The invention of claim 23 wherein the conical angle of said countersunk surface is about 60°.

26. The invention of claim 25 wherein said countersunk surface interrupts said nut thread over an axial distance on the order of magnitude of one thread pitch, or slightly greater.

27. The invention of claim 20 wherein the internal surface of said well portion is cylindrical and coaxial with the nut thread and is of a diameter not greater than about 105% of major thread diameter.

28. The invention of claim 27 wherein said nut body has a countersunk surface axially between said well portion and said nut thread which runs out on said countersunk surface.

29. The invention of claim 28 wherein the conical angle of said countersunk surface is about 60°.

30. The invention of claim 29 wherein said countersunk surface interrupts said nut thread over an axial distance on the order of magnitude of one thread pitch, or slightly greater.

31. The invention of claim 20 wherein the axial length of the internal surface of said well portion is on the order of magnitude of one thread pitch.

32. A prevailing torque type self-locking nut comprising a metallic nut body having first and second opposite ends, an internal screw thread of predetermined nominal major and minor diameters, said thread located between said ends and having a first axial end adjacent said first end of said body and adapted to be entered by a complementary externally threaded member, said body further having a well portion extending axially from said second end of said body toward said thread, said well portion having an internal surface facing the thread axis and spaced therefrom a distance greater than one-half the major thread diameter, and a self-locking element of thread impressionable thermoplastic material, a first portion of which element is within said well portion and a second portion of which element is on said nut thread, said self-locking element having an external surface secured by adhesion to the internal surface of said well portion and to said nut thread and an internal surface confronting the thread axis and spaced therefrom a distance less than one-half the major diameter and said element is formed by melting powder of said material in situ.

33. The invention of claim 32 wherein said nut body has a countersunk surface axially between said well portion and the first end of said nut body and said thread runs out on said countersunk surface and said self-locking element axially traverses said countersunk surface and a portion of said thread axially adjacent said countersunk surface and terminates at a location between the first and second ends of said nut thread.

34. The invention of claim 1 wherein said powder comprises a mixture of particles of said thermoplastic material and epoxy, the ratio by weight of epoxy to total mixture weight having a lower limit of $3\frac{1}{2}\%$.

35. The invention of claim 34 wherein said ratio has an upper limit of less than 15%.

36. The invention of claim 34 wherein said ratio is about $7\frac{1}{2}\%$.

37. The invention of claim 32 wherein said powder comprises a mixture of particles of said thermoplastic material and epoxy, the ratio by weight of epoxy to total mixture weight having a lower limit of $3\frac{1}{2}\%$.

38. The invention of claim 37 wherein said ratio has an upper limit of less than 15%.

39. The invention of claim 37 wherein said ratio is about $7\frac{1}{2}\%$.

* * * * *

UNITED STATES PATENT AND TRADEMARK OFFICE
CERTIFICATE OF CORRECTION

PATENT NO. : 4,282,913

DATED : August 11, 1981

INVENTOR(S) : Paul A. Trimmer

It is certified that error appears in the above—identified patent and that said Letters Patent is hereby corrected as shown below:

Cover sheet, Item [54], delete "AND MANUFACTURE AND COMPONENT THEREFOR"; Item [56], in the fifth entry on the list of References Cited, change "Riere" to --Rieke--; Item [57], line 1, change "is a" to --are--, line 2, change "nut" to --nuts each--, line 14, change "a pin" to --pins--, line 15, delete "a" and change "component" to --components--, line 16, change "nut" to --nuts--.

Column 1, lines 2 and 3, delete "AND MANUFACTURE AND COMPONENT THEREFOR"; line 13, change the comma (,) to a period (.) and before "a" insert --Also disclosed herein are--; line 14, change "a pin" to --pins--; line 15, delete "a", change "component" to --components-- and change "nut" to --nuts--; line 61, change "skirt" to --flange--.

Column 4, line 18, change "Issued" to --issued--; line 25, change "inventive" to --disclosed--; line 46, change "to" to --so--.

Column 7, line 45, change "3/8-18" to --5/8-18--.

Column 9, line 35, change "5/8-28" to --5/8-18--; line 56, change "of the present invention" to --disclosed herein--.

Column 12, line 14, place a period (.) after "1.3" and delete the balance of the line; delete line 15.

UNITED STATES PATENT AND TRADEMARK OFFICE
CERTIFICATE OF CORRECTION

PATENT NO. : 4,282,913
DATED : August 11, 1981
INVENTOR(S) : Paul A. Trimmer

It is certified that error appears in the above—identified patent and that said Letters Patent is hereby corrected as shown below:

Column 15, line 46, start a new paragraph with "By"; delete lines 52 through 56; lines 57 and 58, delete "in its various aspects"; line 66, change "radial" to --axial--.

Column 18, line 50, between "of" and "major" insert --the--.

Signed and Sealed this

Twenty-ninth Day of December 1981

[SEAL]

Attest:

GERALD J. MOSSINGHOFF

Attesting Officer     Commissioner of Patents and Trademarks